United States Patent
Jarasson et al.

(10) Patent No.: US 12,472,907 B2
(45) Date of Patent: Nov. 18, 2025

(54) WIPER OF A WIPER SYSTEM

(71) Applicant: Valeo Systèmes d'Essuyage, Le Mesnil Saint Denis (FR)

(72) Inventors: Jean-Michel Jarasson, Le Mesnil Saint Denis (FR); Gérald Caillot, Le Mesnil Saint Denis (FR); Vincent Izabel, Le Mesnil Saint Denis (FR)

(73) Assignee: Valeo Systemes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 18/574,165

(22) PCT Filed: Jun. 24, 2022

(86) PCT No.: PCT/EP2022/067452
§ 371 (c)(1),
(2) Date: Dec. 26, 2023

(87) PCT Pub. No.: WO2022/269085
PCT Pub. Date: Dec. 29, 2022

(65) Prior Publication Data
US 2024/0317185 A1    Sep. 26, 2024

(30) Foreign Application Priority Data
Jun. 25, 2021 (FR) .................... 2106852

(51) Int. Cl.
*B60S 1/52* (2006.01)
*B60S 1/34* (2006.01)
*B60S 1/38* (2006.01)

(52) U.S. Cl.
CPC ............. *B60S 1/524* (2013.01); *B60S 1/3415* (2013.01); *B60S 1/381* (2013.01)

(58) Field of Classification Search
CPC ........ B60S 1/524; B60S 1/522; B60S 1/3415; B60S 1/3862; B60S 1/3806; B60S 1/3808; B60S 1/381
(Continued)

(56) References Cited

U.S. PATENT DOCUMENTS 3,238,555 A * 3/1966 Cels ................. B60S 1/524
                                                   15/250.4
3,719,819 A * 3/1973 Lowell .............. B60S 1/60
                                                  15/250.04
(Continued)

FOREIGN PATENT DOCUMENTS

DE     19838764 A1    3/2000
FR      2929907 A1   10/2009
(Continued)

OTHER PUBLICATIONS

International Search Report and Written Opinion in corresponding International Application No. PCT/EP2022/067452, dated Sep. 27, 2022 (15 pages).

*Primary Examiner* — Katina N. Henson
(74) *Attorney, Agent, or Firm* — Osha Bergman Watanabe & Burton LLP

(57) ABSTRACT

A wiper of a wiper system for a vehicle is disclosed. The wiper includes at least one wiper blade carried by a support and configured to wipe a glazed surface of a vehicle. The wiper includes a spoiler configured to be connected to a cleaning system distributing cleaning liquid. The spoiled includes a body in which a spray manifold for the cleaning liquid is provided. The spray manifold is configured to be connected to the cleaning system. The spray manifold extends in a main direction of extension of the spoiler and comprises at least one row of spray holes. at least one of the spray holes includes a cleaning liquid passage section. The
(Continued)

spray holes of a row are spaced apart along the main direction of extension of the spoiler.

11 Claims, 4 Drawing Sheets

(58) Field of Classification Search
USPC .................. 15/250.04, 250.201, 250.43
See application file for complete search history.

(56) References Cited

U.S. PATENT DOCUMENTS

| | | | | |
|---|---|---|---|---|
| 3,854,161 | A * | 12/1974 | Benson | B60S 1/524 |
| | | | | 15/250.04 |
| 6,092,259 | A * | 7/2000 | Reppert | B60S 1/20 |
| | | | | 15/250.4 |
| 8,191,198 | B2 * | 6/2012 | Egner-Walter | B60S 1/3862 |
| | | | | 15/250.04 |
| 9,744,948 | B2 * | 8/2017 | Caillot | B60S 1/381 |
| 10,166,952 | B2 * | 1/2019 | Egner-Walter | B60S 1/42 |
| 2008/0216274 | A1 * | 9/2008 | Egner-Walter | B60S 1/524 |
| | | | | 15/250.02 |
| 2012/0198646 | A1 * | 8/2012 | Kempfer | B60S 1/524 |
| | | | | 15/250.04 |
| 2014/0331434 | A1 * | 11/2014 | Shimoyama | B60S 1/381 |
| | | | | 15/250.04 |
| 2020/0216035 | A1 * | 7/2020 | Hartman | B60S 1/524 |

FOREIGN PATENT DOCUMENTS

| | | | | |
|---|---|---|---|---|
| FR | 2961457 | A1 | 12/2011 | |
| FR | 3046763 | A1 | 7/2017 | |
| FR | 3046765 | A1 * | 7/2017 | ............. B60S 1/381 |

* cited by examiner

[Fig. 1]
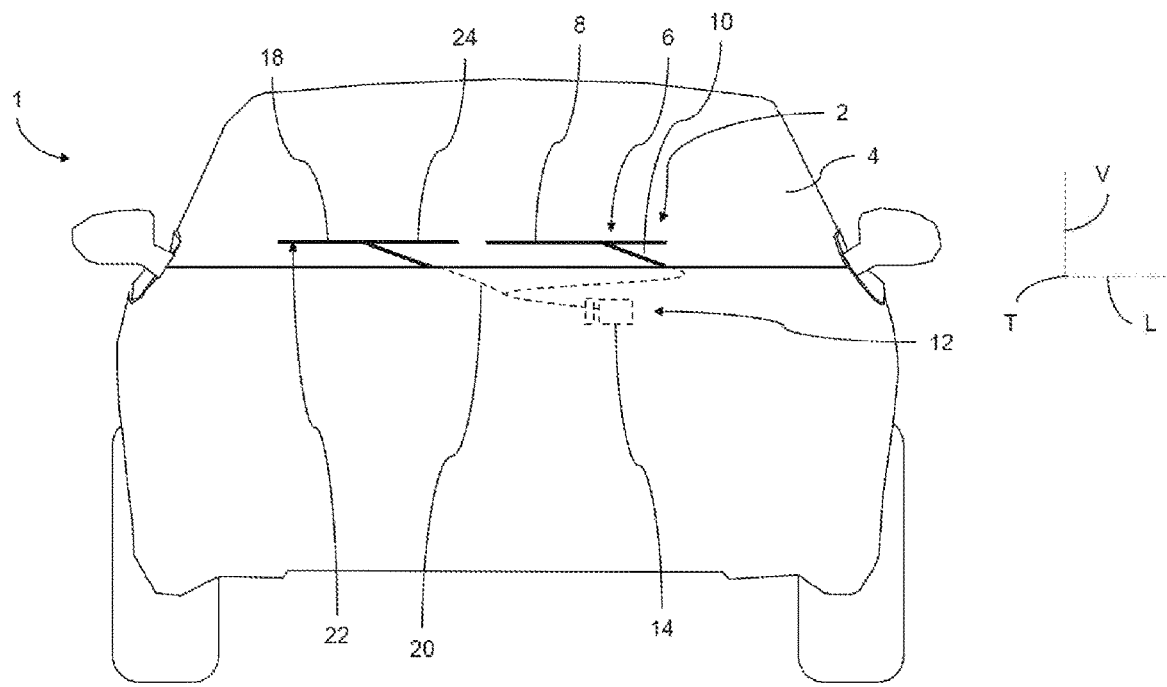
[Fig. 2]
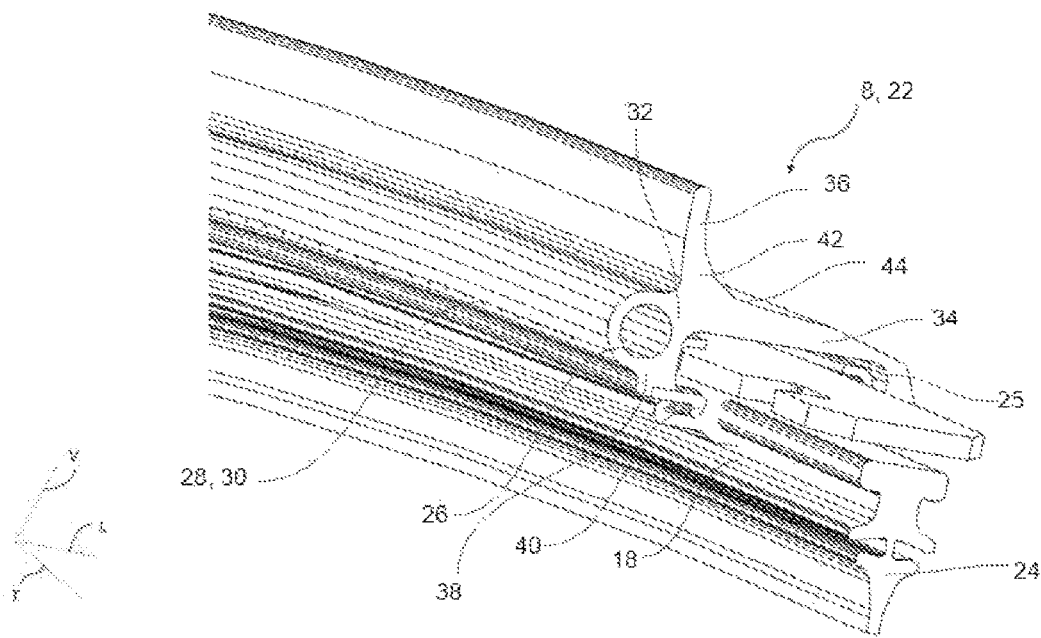

[Fig. 3]
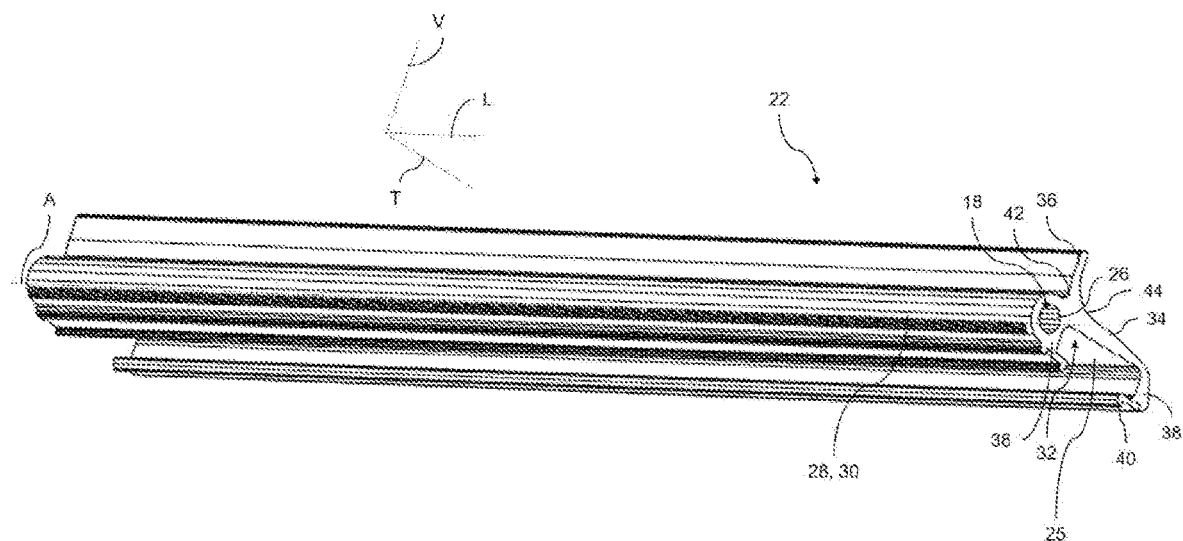
[Fig. 4]
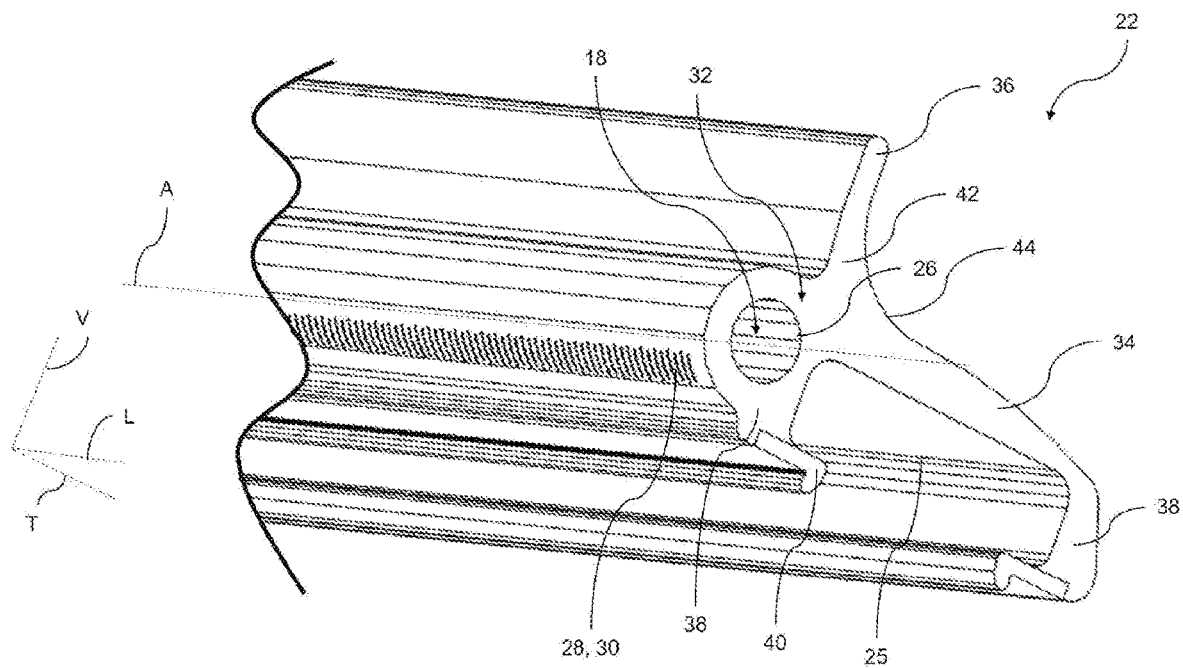

[Fig. 5]
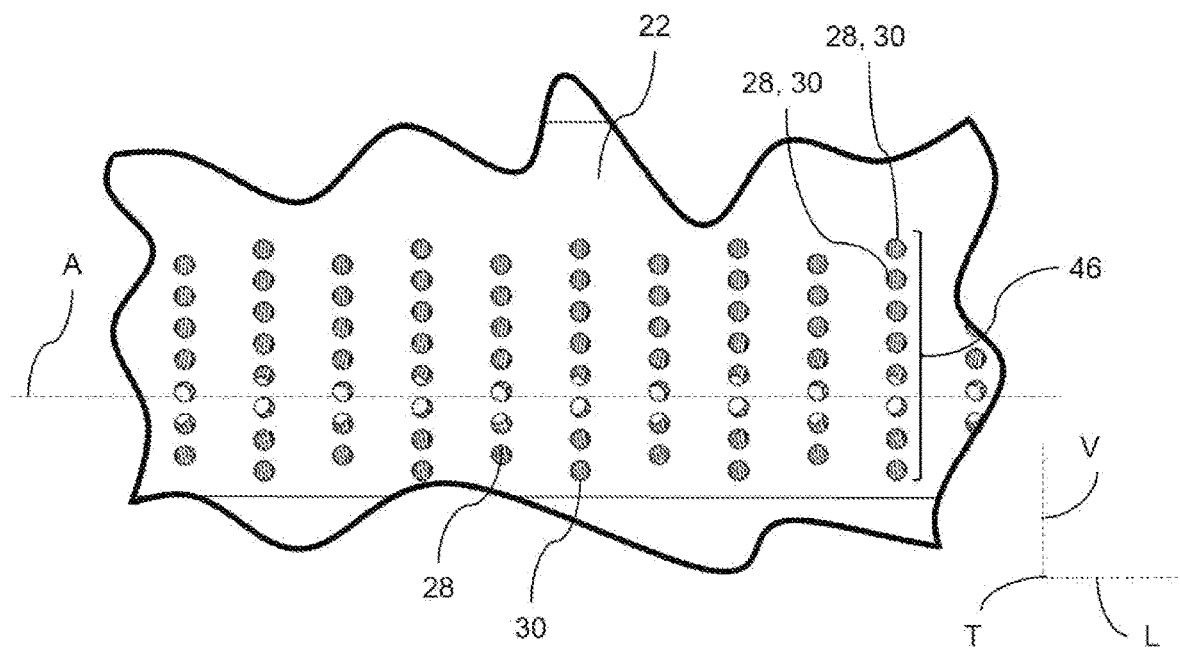

[Fig. 6]
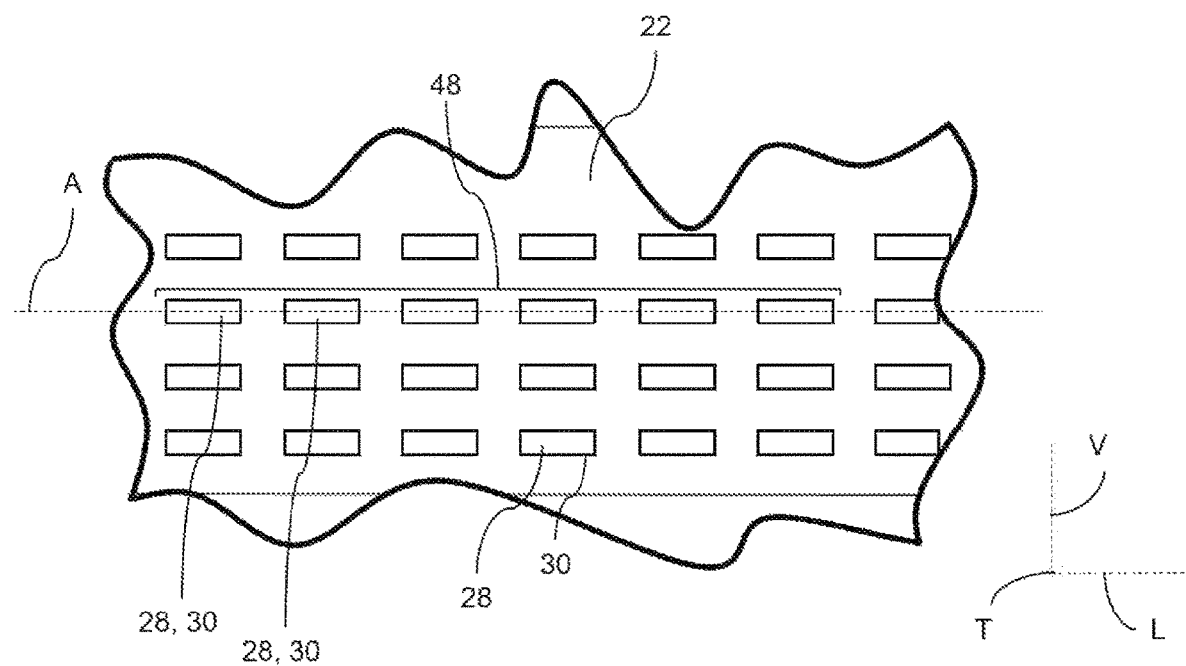

WIPER OF A WIPER SYSTEM

The present invention relates to the field of wiper systems for glazed surfaces, notably for a windshield or rear window of a vehicle. More particularly, the present invention relates to a wiper of such a wiper system in collaboration with the cleaning systems.

In general, a vehicle includes a glazed surface placed at the front of the vehicle, a driver thus being able to see the environment in front of the vehicle. The glazed surface must be transparent and optically neutral so that the driver can clearly see the environment in front of the vehicle. Owing to its position, whether the vehicle is stationary or traveling on a road, the glazed surface is exposed to weather conditions, such as rain for example, but also to certain particles or dirt which can obstruct at least partially the driver's view of the environment at the front of the vehicle. To get rid of these various elements, the vehicle includes a wiper system capable of wiping and thus getting rid of the water and the various elements present on the glazed surface of the vehicle outside the glazed surface of the vehicle.

It is known practice for such wiper systems to comprise at least an arm and a wiper, the arm being secured to the vehicle at one of its ends and carrying the wiper at its opposite end. The arm is more specifically connected to a shaft of a motor installed on the vehicle, the arm being able to be driven in a back and forth movement about a main direction of extension of the shaft. The arm itself drives the wiper against the glazed surface of the vehicle to get rid of water and elements obstructing the driver's view.

It is known practice to equip these vehicles with a cleaning system configured to spray a cleaning liquid against the glazed surface of the vehicle to facilitate the wiping of particles or dirt present on the glazed surface. Such cleaning systems may include cleaning liquid spray nozzles installed on the hood of the vehicle as close as possible to the glazed surface to be cleaned, and/or may include a spray manifold installed directly on the arm and/or on the wiper of the wiper system in order to spray the cleaning liquid even closer and more evenly. Such a spray manifold comprises a row of cleaning liquid spray holes. It is known practice to install the row of spray holes along the wiper. In this way, the row of spray holes distributes cleaning liquid over the entirety of an area to be wiped of the glazed surface over which the wiper passes. However, the shape of the spray holes together with their distribution along the wiper do not afford optimal wettability of the glazed surface, which may result in streaks of cleaning liquid on the glazed surface after the wiper has passed, or the absence of liquid in a particular area of the glazed surface.

The present invention falls within this context by proposing a system comprising a spray manifold making it possible to improve the wettability of the glazed surface compared to an already existing system equipped with a spray manifold.

The main subject matter of the present invention is a wiper of a wiper system for a vehicle comprising at least one wiper blade carried by a support and configured to wipe a glazed surface of a vehicle, the wiper comprising a spoiler configured to be connected to a cleaning system distributing cleaning liquid, the spoiler comprising a body in which a spray manifold for the cleaning liquid is provided, which spray manifold is configured to be connected to the cleaning system, the spray manifold extending in a main direction of extension of the spoiler and comprising at least one row of spray holes, characterized in that at least one of the spray holes has a cleaning liquid passage section of between 0.002 mm$^2$ and 0.070 mm$^2$, and in that the spray holes of a row are spaced apart by a spacing of between 0.15 and 10 mm along the main direction of extension of the spoiler.

In other words, the spoiler of the wiper according to the invention is configured to be connected to a cleaning system distributing cleaning liquid, the spoiler comprising a body which, on the one hand, delimits a housing for a support of a wiper blade, and on the other hand comprises a fin protruding opposite the housing, the spoiler comprising a spray manifold for the cleaning liquid disposed through the body, the spray manifold comprising at least one distribution tube extending in a main direction of extension of the spoiler, the distribution tube being configured to be connected to the cleaning system, the spray manifold comprising a plurality of channels distributed along the main direction of extension of the spoiler, the spray manifold comprising a plurality of spray holes, each of the channels extending between the distribution tube and a spray hole of the plurality of spray holes, in which at least one of the channels comprises a cleaning liquid passage section of between 0.002 mm$^2$ and 0.070 mm$^2$, and in which the spray holes of a row are spaced apart by a spacing of between 0.15 and 10 mm along the main direction of extension of the spoiler.

It will be understood from the above that the wiper comprises on the one hand, the spoiler and on the other hand, the wiper blade intended to be in contact with the glazed surface of the vehicle. The wiper blade comprises a support intended to interact with the housing delimited by the body of the spoiler in such a way that the wiper blade is secured to the spoiler.

The spray manifold includes the distribution tube and the plurality of channels extending radially from the distribution tube toward the outside of the spoiler. Each channel extends between the distribution tube and a spray hole such that the cleaning liquid flowing in the distribution tube also flows through each channel toward the dedicated spray hole.

According to an optional feature of the invention, the passage section of the channel between 0.002 mm$^2$ and 0.070 mm$^2$ is close to the spray hole.

A passage section of between 0.002 mm$^2$ and 0.070 mm$^2$ promotes misting of the cleaning liquid, this misting increasing the wettability of the cleaning liquid on the glazed surface of the vehicle.

Furthermore, the spacing between two spray holes in the same row, of between 0.15 and 10 mm, optimizes the distribution of the misted cleaning liquid against the glazed surface of the vehicle. To be specific, the spray holes are thus arranged all along the spoiler, ensuring regular distribution of the misted cleaning liquid all along the spoiler.

Such a spacing between the spray holes also makes it possible to obtain the best compromise between the quality of cleaning (i.e. wettability) and the consumption of cleaning liquid.

According to an optional feature of the invention, at least one of the spray holes of the at least one row has a cleaning liquid passage section of between 0.004 mm$^2$ and 0.070 mm$^2$.

According to an optional feature of the invention, at least one of the spray holes of the at least one row has a cleaning liquid passage section of between 0.008 mm$^2$ and 0.070 mm$^2$.

According to an optional feature of the invention, at least one of the spray holes of the at least one row has a cleaning liquid passage section of between 0.01 mm$^2$ and 0.070 mm$^2$.

According to an optional feature of the invention, at least one of the spray holes of the at least one row has a cleaning liquid passage section of between 0.02 mm$^2$ and 0.070 mm$^2$.

According to an optional feature of the invention, at least one of the spray holes of the at least one row has a cleaning liquid passage section of between 0.002 mm² and 0.050 mm².

According to an optional feature of the invention, at least one of the spray holes of the at least one row has a cleaning liquid passage section of between 0.008 mm² and 0.050 mm².

According to an optional feature of the invention, the spray holes of a row are spaced apart by a spacing of between 0.75 and 10 mm along the main direction of extension of the spoiler.

According to an optional feature of the invention, the spray holes of a row are spaced apart by a spacing of between 1.0 and 10 mm along the main direction of extension of the spoiler.

According to an optional feature of the invention, the spray holes of a row are spaced apart by a spacing of between 1.5 and 10 mm along the main direction of extension of the spoiler.

According to an optional feature of the invention, the spray holes of a row are spaced apart by a spacing of between 2.8 and 10 mm along the main direction of extension of the spoiler.

According to an optional feature of the invention, the spray holes of a row are spaced apart by a spacing of between 0.75 and 9 mm along the main direction of extension of the spoiler.

According to an optional feature of the invention, the spray holes of a row are spaced apart by a spacing of between 1 and 8 mm along the main direction of extension of the spoiler.

According to an optional feature of the invention, at least one of the spray holes has a cleaning liquid passage section of between 0.01 mm² and 0.070 mm², and the spray holes of a row are spaced apart by a spacing of between 1.5 and 10 mm along the main direction of extension of the spoiler.

According to an optional feature of the invention, at least one of the spray holes has a cleaning liquid passage section of between 0.2 mm² and 0.070 mm², and the spray holes of a row are spaced apart by a spacing of between 2.8 and 10 mm along the main direction of extension of the spoiler.

According to an optional feature of the invention, at least one spray hole of the at least one row of spray holes has a substantially circular shape.

In other words, the at least one channel of the plurality of channels extends from the distribution tube to the spray hole having a circular shape.

According to an optional feature of the invention, at least one spray hole of the at least one row of spray holes has a substantially rectangular shape.

In other words, the at least one channel extends from the distribution tube to the spray hole having a rectangular shape.

According to an optional feature of the invention, at least one spray hole of the at least one row of spray holes has a star shape.

In other words, the at least one channel extends from the distribution tube to the spray hole having a star shape.

According to another optional feature of the invention, the plurality of channels has the same section between the distribution tube and the spray hole dedicated to each channel.

According to another optional feature of the invention, at least one spray hole has a shape different to another spray hole.

According to another optional feature of the invention, the spray manifold comprises only one row of spray holes aligned in the main direction of extension of the spoiler.

According to another optional feature of the invention, the spray manifold comprises at least two separate rows of spray holes aligned in the main direction of extension of the spoiler.

According to another optional feature of the invention, the plurality of spray holes comprises a first set of spray holes having a first shape and a second set of spray holes having a second shape, the first set of spray holes being distributed along the main direction of extension of the spoiler alternating with the second set of spray holes.

According to another optional feature of the invention, the spray manifold comprises a distribution tube extending in a main direction of extension of the spoiler and a plurality of channels distributed along the main direction of extension of the spoiler, each of the channels extending between the distribution tube and the spray hole of the plurality of spray holes.

According to another optional feature of the invention, the plurality of channels comprises at least two separate rows of channels aligned in the main direction of extension of the spoiler. Note that the number of separate rows of channels is at least two and may be three, four or more.

According to another optional feature of the invention, the spray manifold comprises a plurality of channels distributed along the main direction of extension of the spoiler, the plurality of channels comprises at least two separate alignments of channels aligned in a direction secant to the main direction of extension of the spoiler.

In other words, the plurality of channels comprises at least two separate alignments of channels aligned in a direction secant to the main direction of extension of the spoiler.

According to another optional feature of the invention, the plurality of channels comprises at least two alignments of channels aligned in a direction perpendicular to the main direction of extension of the spoiler.

According to another optional feature of the invention, the spray manifold comprises a plurality of rows of channels distributed radially around the distribution tube over an angular sector of between 5° and 30°. This angular sector is the sector facing the area of the glazed surface to be wiped by the wiper.

According to another optional feature of the invention, at least some channels of the plurality of channels are arranged staggered across the body of the spoiler.

According to another optional feature of the invention, the spray holes of the at least one row of spray holes are distributed uniformly along the main direction of extension of the spoiler.

In other words, the plurality of channels is distributed uniformly along the main direction of extension of the spoiler. The term "uniform" means that the plurality of channels forms a pattern which is repeated several times along the main direction of extension of the spoiler, a pattern being formed by at least one spray hole.

According to another optional feature of the invention, the spray holes of the at least one row of spray holes are distributed irregularly along the main direction of extension of the spoiler.

In other words, the plurality of channels is distributed irregularly along the main direction of extension of the spoiler.

According to another optional feature of the invention, the total section of the spray holes is between 1 mm² and 3 mm².

The total section of the spray holes corresponds to the sum of the sections of all the spray holes.

According to a first example, the spray manifold may comprise a certain number of channels or spray holes spaced apart by a certain spacing and having a defined passage section.

According to a second example, the spray manifold may comprise a greater number of channels or spray holes because they are spaced apart by a smaller spacing with respect to the first example, the channels having a passage section smaller than that of the holes in the first example.

According to a third example, the spray manifold may comprise a smaller number of channels or spray holes because they are spaced apart by a larger spacing with respect to the first example, the channels having a passage section greater than that of the holes in the first example.

According to another optional feature of the invention, the support of the wiper blade is arranged in the housing of the spoiler.

Further features, details and advantages of the invention will become more clearly apparent from reading the following description, and from a number of exemplary embodiments given by way of non-limiting indication, with reference to the appended schematic drawings, in which:

FIG. 1 schematically depicts a vehicle equipped with a wiper system comprising a wiper according to the invention;

FIG. 2 is a view of details of the wiper system according to the invention;

FIG. 3 is a perspective view of a spoiler of the wiper according to the invention;

FIG. 4 is a view of details of the spoiler shown in FIG. 3;

FIG. 5 depicts a first embodiment of a plurality of spray holes of the spoiler shown in FIG. 3;

FIG. 6 depicts a second embodiment of a plurality of spray holes of the spoiler shown in FIG. 3.

The features, variants and different embodiments of the invention may be combined with one another, in various combinations, as long as they are not mutually incompatible or mutually exclusive. It will be possible, in particular, to conceive of variants of the invention that comprise only a selection of the features described hereinafter, in isolation from the other features described, if this selection of features is sufficient to confer a technical advantage and/or to distinguish the invention from the prior art.

In the following description, the terms "longitudinal", "transverse" and "vertical" refer to the orientation of a spoiler according to the invention. A longitudinal direction corresponds to a main direction of extension of the spoiler, this longitudinal direction being parallel to a longitudinal axis L of a coordinate system L, V, T shown in the figures. A vertical direction corresponds to a direction in which a fin of the spoiler extends, this vertical direction being parallel to a vertical axis V of the coordinate system L, V, T, and this vertical axis V being perpendicular to the longitudinal axis L. Finally, a transverse direction corresponds to a direction parallel to a transverse axis T of the coordinate system L, V, T, this transverse axis T being perpendicular to the longitudinal axis L and to the vertical axis V.

As shown in FIG. 1, a vehicle 1 is equipped with a wiper system 2 arranged on a glazed surface 4 of the vehicle 1. The wiper system 2 comprises at least a first wiper device 6 composed of a first wiper 8 and a first wiper arm 10. The first wiper arm 10 is secured at one of its ends to the vehicle 1 and at the other of its ends to the first wiper 8, the first wiper 8 being arranged on the glazed surface 4 of the vehicle 1. More specifically, the first wiper arm 10 is secured to a drive arm constituting an electric motor, the drive arm and the electric motor not being shown in all of the figures.

The electric motor tends to drive the first wiper arm 10 in a back and forth movement, the first wiper arm 10 thus driving the first wiper 8 in this back and forth movement on the glazed surface 4 of the vehicle 1. By virtue of this movement, the first wiper 8 scrapes the glazed surface 4 of the vehicle 1 to clean it. The wiper system 2 comprises a second wiper device 6 having the same features as the first wiper device 6, comprising a second wiper 8 and a second wiper arm 10.

Furthermore, the term "wiper device 6" can refer equally to the first wiper device 6 as to the second wiper device 6. Likewise, the term "wiper arm 10" can refer equally to the first wiper arm 10 as to the second wiper arm 10, while the term "wiper 8" can also refer equally to the first wiper 8 as to the second wiper 8.

In addition, the components of the second wiper device 6 are identical to the components of the first wiper device 6. Thus, the following description of the features of the components of the first wiper device 6 is applicable to the components of the second wiper device 6, in particular for the second wiper 8 and the second wiper arm 10.

The vehicle 1 is also equipped with a cleaning system 12 spraying a cleaning liquid onto the glazed surface 4 of the vehicle 1 to optimize wiping of the glazed surface 4 by the wiper system 2. For this purpose, the cleaning system 12 comprises a pump 14 which propels the cleaning liquid, from a reservoir, through a distribution network 16 toward at least one spray manifold 18. The distribution network 16 connects the pump 14 to at least a first spray manifold 18 provided on the first wiper 8. The distribution network 16 connects the pump 14 to a second spray manifold 18 similar to the first spray manifold 18, this second spray manifold 18 being arranged on the second wiper 8. In the remainder of the description, the term "spray manifold 18" will refer equally to one and/or the other of the first and second spray manifolds 18.

As shown schematically in FIGS. 1 and 2, the wiper 8 according to the invention comprises at least one spoiler 22 and a wiper blade 24 both extending mainly in a longitudinal direction L. The wiper blade 24 is the element of the wiper 8 in direct contact with the glazed surface 4 of the vehicle 1. The spoiler 22 is the element which optimizes the aerodynamics of the wiper 8 by using a force generated by the wind, when the vehicle 1 is traveling, to press and keep the wiper blade 24 in contact with the glazed surface 4 of the vehicle 1. Furthermore, the wiper blade 24 comprises a support intended to be carried by the spoiler 22, the latter comprising a housing 25 for the support. Note that the support of the wiper blade 24 interacts with the housing 25 of the spoiler 22 to secure the wiper blade 24 to the spoiler 22.

The spoiler 22 will now be described in more detail with particular reference to FIGS. 2 to 6.

In FIGS. 2 to 4, the spoiler 22 of the wiper 8 according to the invention is illustrated more particularly. The latter comprises at least the spray manifold 18 for spraying a cleaning liquid, the spray manifold 18 comprising at least one distribution tube 26 for the cleaning liquid and a plurality of channels 28 extending between the distribution tube 26 and a plurality of spray holes 30. More particularly, the distribution tube 26 is connected to the distribution network 16 of the cleaning system 12, the pump 14 of the latter forcing the flow of cleaning liquid to the distribution tube 26. The cleaning liquid then flows through the channels 28 from the distribution tube 26 toward the spray hole 30 assigned to each channel 28. Note that the cleaning liquid is sprayed against the glazed surface 4 of the vehicle 1 at the spray hole 30. In this configuration, the pump 14 of the cleaning system 12 makes it possible to force the flow of the cleaning liquid from the reservoir 20 to the spray hole 30.

A more detailed description of the spray manifold 18 will be provided following the general description of the spoiler 22 set out below, which refers to FIGS. 2 to 4.

The spoiler 22 comprises a body 32 composed of at least one upper wall 34 from which there protrude at least one fin 36 and the spray manifold 18.

According to the example illustrated in FIGS. 2 to 4, the body 32 comprises at least two side walls 38 and an upper wall 34 which help to delimit the housing 25 for the support of the wiper blade 24. More particularly, the upper wall 34 extends mainly in a plane parallel to the longitudinal L and transverse T directions. The side walls 38 each extend in a plane parallel to the longitudinal L and vertical V directions and each from one of the transverse ends of the upper wall 34. Each of the side walls 38 extends facing the other side wall 38, from the upper wall 34 opposite the fin 36.

In other words, the side walls 38 and the upper wall 34 of the spoiler 22 extend such that a section of the side walls 38 and of the upper wall 34 has a "U" shape, the section being seen in a plane perpendicular to a main direction of extension A of the spoiler 22, this main direction of extension A being substantially parallel to the longitudinal direction L. Note that the side walls 38 form the arms of the "U" and that the upper wall 34 forms the base of the "U".

Each of the side walls 38 has, at one free end, a fixing claw 40 extending from said free end toward the other fixing claw 40. Each fixing claw 40 helps, on the one hand, to delimit the housing 25 for the support of the wiper blade and on the other hand, to secure the support of the wiper blade 24 to the spoiler 22.

The fin 36 comprises a base 42 connecting a portion of the fin 36 extending in a plane parallel to the longitudinal L and vertical V directions to the upper wall 34. More particularly, the fin 36 has a curvature 44 at its base 42, this curvature 44 connecting the upper wall 34 to a free end of the fin 36, thus making the link between the main plane of extension of the upper wall 34 and the main plane of extension of the fin 36. The curvature 44 at the base 42 of the fin 36 gives the spoiler 22 an aerodynamic advantage making it possible to keep the wiper blade 24 pressed against the glazed surface 4 of the vehicle 1, in particular when the latter is traveling.

As can be seen more particularly in FIGS. 2 to 4, the spray manifold 18 extends mainly in the main direction of extension A through the body 32 of the spoiler 22, for example on one of the side walls 38 of the body 32.

In the embodiment of FIG. 2, the spray manifold 18 comprises a single row of spray holes 30.

In the embodiment of FIGS. 3 to 6, the spray manifold 18 comprises at least two rows of spray holes 30.

According to the invention, at least one of the spray holes 30 has a cleaning liquid passage section of between 0.002 mm² and 0.070 mm², and the spray holes 30 per row are spaced apart by a spacing of between 0.15 and 10 mm along the main direction of extension A of the spoiler 22.

In other words, at least one of the channels 28 has a cleaning liquid passage section of between 0.002 mm² and 0.070 mm², and the spacing between the channels of the same row is between 0.15 and 10 mm along the main direction of extension A of the spoiler. According to an optional feature of the invention, all of the channels of the spoiler have a cleaning liquid passage section of between 0.01 mm² and 0.070 mm². According to an optional feature of the invention, all of the channels of the spoiler have a cleaning liquid passage section of between 0.02 mm² and 0.070 mm².

A section of the channel 28 having a surface area of between 0.002 mm² and 0.070 mm² optimizes misting of the cleaning liquid when the cleaning liquid flows through the channel 28 from the distribution tube 26 toward the spray hole 30. It will be understood from the above that the cleaning liquid flows in the liquid state at the inlet of the channel 28 in the direction of flow of the cleaning liquid in the channel 28, the cleaning liquid in the liquid state is then misted at the section having a surface area of between 0.002 mm² and 0.070 mm², before being expelled in the form of mist at the spray hole 30. Furthermore, this misting increases the wettability of the glazed surface 4 of the vehicle 1, particularly in the area to be wiped by the wiper 8.

The passage section of the channel 28 between 0.002 mm² and 0.070 mm² is preferably close to the spray hole 30. Note that the misting effect produced by this section of the channel 28 is optimized when this section is installed as close as possible to the spray hole 30.

According to the invention, the passage section of the channel 28 between 0.002 mm² and 0.070 mm² is coincident with the spray hole 30. In other words, it is the spray hole 30 which has a cleaning liquid passage section of between 0.002 mm² and 0.070 mm².

According to an alternative of the invention, the passage section of the channel 28 between 0.002 mm² and 0.070 mm² is not coincident with the spray hole 30.

According to the example illustrated here, each channel 28 of the plurality of channels 28 has a cleaning liquid passage section of between 0.002 mm² and 0.070 mm².

According to an optional feature of the invention, at least one of the channels 28 has a cleaning liquid passage section of between 0.002 mm² and 0.070 mm².

Furthermore, the spacing between the spray holes 30 in the same row, of between 0.15 and 10 mm, optimizes the distribution of the misted cleaning liquid against the glazed surface 4 of the vehicle 1 and thus makes it possible to obtain the best compromise between the quality of cleaning (i.e. wettability) and the consumption of cleaning liquid.

To be specific, the spacing between the spray holes 30 in the same row arranged all along the spoiler 22 ensures regular distribution of the misted cleaning liquid all along the spoiler 22. It will be understood from the above that the distribution of the misted cleaning liquid all along the spoiler 22 promotes better wettability all along the spoiler 22 and allows a homogeneous distribution of the spoiler 22, thus preventing traces from being left on the glazed surface 4 of the vehicle 1, while optimizing the consumption of cleaning liquid.

This combination of features of the spacing between the plurality of channels 28/spray holes 30 thus makes it possible to optimize, on the one hand, the phenomenon of misting of the cleaning liquid along the spoiler 22 and, on the other hand, better wettability of the glazed surface 4 of the vehicle 1, also all along the spoiler 22.

According to one feature of the invention, the total section of the spray holes 30 is between 1 mm² and 3 mm². The term "total section" means the sum of all the passage sections of the spray holes 30 of the spray manifold 18.

According to a first exemplary embodiment of the invention, the spray manifold 18 may comprise a certain number of channels 28 spaced apart by a certain spacing with spray holes 30 having a defined passage section, the passage section of each spray hole 30 being for example between 1 mm² and 3 mm². The sum of the passage sections of the spray holes 30 referred to in this case corresponds to the total section mentioned above.

According to a second exemplary embodiment of the invention, the spray manifold 18 may comprise a greater number of channels 28 spaced apart by a smaller spacing than in the first example, the spray holes 30 dedicated to each of the channels 28 having a smaller passage section than that of the spray holes 30 in the first example, that is to say a passage section of less than 1 mm², for example.

According to a third exemplary embodiment of the invention, the spray manifold 18 may comprise a smaller number of channels 28 spaced apart by a larger spacing than in the first example, the spray holes 30 dedicated to each of the channels 28 having a bigger passage section than that of the spray holes 30 in the first example, that is to say a passage section of greater than 3 mm², for example.

As shown in FIGS. 2 to 4, the plurality of channels 28 is distributed uniformly along the main direction of extension A of the spoiler 22. The term "uniform" means that the plurality of channels 28 forms a pattern which is repeated several times along the main direction of extension A of the spoiler 22, a pattern being formed by at least one spray hole 30.

In the example illustrated here in FIGS. 3 and 4, a pattern of channels 28 is formed and has the shape of a slot extending at least partially radially around the distribution tube 26. This slot-shaped pattern is reproduced at regular intervals along the distribution tube 26, that is to say along the main direction of extension A of the spoiler 22.

According to another alternative of the invention, the plurality of channels 28 is distributed irregularly along the main direction of extension A of the spoiler 22. It will be understood here that a pattern formed by at least one channel 28 is not reproduced along the main direction of extension A, a first distance separating two first channels 28 neighboring one another being different from a second distance separating two other channels 28 neighboring one another.

In addition, the plurality of spray holes 30, and by extension the plurality of channels 28 is, according to an optional feature of the invention, distributed radially around the distribution tube 26 over an angular sector of between 5° and 30°. This angular sector corresponds to the sector facing the area of the glazed surface 4 to be wiped by the wiper 8. This angular sector is measured for example from a main plane of extension of the side wall 38, this plane being parallel to the longitudinal L and vertical V directions. In this way, the misted cleaning liquid is sprayed at the spray hole 30 directly onto the glazed surface 4 of the vehicle 1, thus limiting the loss of misted cleaning liquid in the external environment of the vehicle 1.

A first embodiment of the invention illustrated in FIG. 5 will now be described in more detail before describing a second embodiment of the invention with reference to FIG. 6.

According to a first embodiment of the invention, and as shown in FIG. 5, at least one channel 28 of the plurality of channels 28 extends from the distribution tube 26 to the spray hole 30 having a circular shape.

The channel 28 extends in the form of a hollow cylinder between distribution tube 26 and the spray hole 30. It will thus be understood that the channel 28 has a single same section between the distribution tube 26 and the spray hole 30.

According to an alternative of the invention, the channel 28 extends in the form of a cone between distribution tube 26 and the spray hole 30. The passage section of the channel 28 may thus open out toward the outside, that is to say that a passage section of the channel 28 tends to increase as it gets closer to the spray hole 30. Conversely, the passage section of the channel 28 may thus close up toward the outside, that is to say that a passage section of the channel 28 tends to decrease as it gets closer to the spray hole 30.

According to an optional feature of the invention, the plurality of channels 28 has the same section between the distribution tube 26 and the spray hole 30 dedicated to each channel 28. More specifically, each channel 28 has a similar shape and extends between the distribution tube 26 and the spray hole 30 having the same shape.

Moreover, and as shown in FIG. 5, the plurality of channels 28 comprises at least two alignments 46 of channels 28 aligned in a direction secant to the main direction of extension A of the spoiler 22.

Note that at least two first channels 28 are aligned in a direction secant to the main direction of extension A, forming a first alignment 46, and that at least two other channels 28 are aligned in a direction secant to the main direction of extension A, forming a second alignment 46, the first alignment 46 and the second alignment 46 extending parallel to one another.

According to an optional feature of the invention, the first alignment 46 and the second alignment 46 extend perpendicular to the main direction of extension A of the spoiler 22.

Moreover, and as can be seen more particularly in FIG. 5, at least some channels 28 of the plurality of channels 28 are distributed staggered across the body 32 of the spoiler 22. The term "staggered" means that a first group of spray holes 30 is aligned in a first direction parallel to the main direction of extension A and that a second group of spray holes 30 is aligned in a second direction parallel to the main direction of extension A, the first direction being distinct from the second direction. In other words, the spray holes 30 are offset radially from one another while being aligned with one another.

A second embodiment of the invention shown in FIG. 6 will now be described in more detail.

According to a second embodiment of the invention, and as shown in FIG. 6, at least one channel 28 extends from the distribution tube 26 to the spray hole 30 having a rectangular shape. In this configuration, the channel 28 may extend in the form of a hollow rectangular parallelepiped from the distribution tube 26 to the spray hole 30 having the same section all the way along. However, a channel 28 extending in the form of a hollow rectangular parallelepiped with a channel 28 section which varies between the distribution tube 26 and the spray hole 30 would not depart from the scope of the invention.

As can be seen more particularly in FIG. 6, the plurality of channels 28 comprises at least two rows 48 of channels 28 aligned in the main direction of extension A of the spoiler 22. In this way, the plurality of channels 28 is organized in rows 48 arranged parallel to one another and parallel to the main direction of extension A of the spoiler 22. The plurality of spray holes 30 also extends in rows 48 in a direction parallel to the main direction of extension A of the spoiler 22.

Cumulatively, the plurality of channels 28 and the plurality of spray holes 30 may also be organized in the form of alignments 46 in a direction secant, or perpendicular, to the main direction of extension A of the spoiler 22 in addition to the rows 48 described previously. It will thus be understood that the channels 28 and the spray holes 30 are aligned with one another, forming a grid.

According to an alternative of the invention, at least one channel 28 extends from the distribution tube 26 to the spray hole 30 having a star shape. The channels 28 may also extend with a star-shaped section from the distribution tube 26 to the spray hole 30.

Moreover, at least one spray hole 30 has a shape different to another spray hole 30. It will be understood here that a majority of spray holes 30 extend with a first shape, for example circular, and that at least one spray hole 30 extends with a second shape, for example rectangular.

In this configuration, it could be envisaged that the plurality of spray holes 30 comprises a first set of spray holes 30 having a first shape and a second set of spray holes 30 having a second shape, the first set of spray holes 30 being distributed along the main direction of extension A of the spoiler 22 alternating with the second set of spray holes 30. This alternation may for example be an alternation between a first alignment 46 of spray holes 30 having the first shape and a second alignment 46 of spray holes 30 having the second shape.

The present invention is not however limited to the means and configurations described and illustrated in the present document, and also extends to all equivalent means and configurations and to any technically operational combination of such means. In particular, the rows 48 and the alignments 46 of the holes may be organized in a staggered arrangement, as described earlier in the description. Furthermore, the spray holes 30, just like a section of at least one channel 28, may have a shape different from those which have been described above, as long as they achieve the aim set by the invention.

The invention claimed is:

1. A wiper of a wiper system for a vehicle, the wiper comprising:
   at least one wiper blade carried by a support and configured to wipe a glazed surface of a vehicle,
   a spoiler configured to be connected to a cleaning system distributing cleaning liquid,
   wherein the spoiler comprises a body,
   wherein a spray manifold for the cleaning liquid is provided within the body,
   wherein the spray manifold is configured to be connected to the cleaning system, extends in a main direction of extension of the spoiler and comprises at least one row of spray holes,
   wherein at least one of the spray holes comprises a cleaning liquid passage section of between 0.002 mm$^2$ and 0.070 mm$^2$ in cross-sectional area,
   wherein the spray holes of a row are spaced apart by a spacing of between 0.15 and 10 mm along the main direction of extension of the spoiler,
   wherein the cleaning liquid passage section is configured to mist the cleaning liquid and distribute the misted cleaning liquid against the glazed surface,
   wherein the spray manifold comprises:
      a distribution tube extending in a main direction of extension of the spoiler, and
      a plurality of channels distributed along the main direction of extension of the spoiler,
   wherein each of the channels extends between the distribution tube and the spray hole of the plurality of spray holes, and
   wherein the plurality of channels comprises at least two separate alignments of channels aligned in a direction secant to the main direction of extension of the spoiler.

2. The wiper as claimed in claim 1,
wherein at least one of the spray holes comprises a cleaning liquid passage section of between 0.010 mm$^2$ and 0.070 mm$^2$ in cross-sectional area, and
wherein the spray holes of a row are spaced apart by a spacing of between 1 and 10 mm along the main direction of extension of the spoiler.

3. The wiper as claimed in claim 1,
wherein at least one of the spray holes comprises a cleaning liquid passage section of between 0.020 mm$^2$ and 0.070 mm$^2$ in cross-sectional area, and
wherein the spray holes of a row are spaced apart by a spacing of between 1 and 5 mm along the main direction of extension of the spoiler.

4. The wiper as claimed in claim 1,
wherein at least one spray hole of the at least one row of spray holes comprises a circular shape.

5. The wiper as claimed in claim 1,
wherein at least one spray hole of the at least one row of spray holes comprises a rectangular shape.

6. The wiper as claimed in claim 1,
wherein the spray manifold comprises only one row of spray holes aligned in the main direction of extension of the spoiler.

7. The wiper as claimed in claim 1,
wherein the spray manifold comprises at least two separate rows of spray holes aligned in the main direction of extension of the spoiler.

8. The wiper as claimed in claim 1,
wherein the spray manifold comprises a plurality of rows of channels distributed radially around the distribution tube over an angular sector of between 5° and 30°.

9. The wiper as claimed in claim 1,
wherein two or more channels of the plurality of channels are arranged staggered across the body of the spoiler.

10. The wiper as claimed in claim 1,
wherein the spray holes of the at least one row of spray holes are distributed uniformly along the main direction of extension of the spoiler.

11. The wiper as claimed in claim 1, wherein a total section of the spray holes is between 1 mm$^2$ and 3 mm$^2$ in area.

* * * * *